United States Patent [19]

Osswald et al.

[11] 4,246,214
[45] Jan. 20, 1981

[54] METHOD OF MOLDING POLYURETHANE FOAMS IN STEAM HEATED MOLDS AND ADHESION STEAM CONDENSATE IS USED TO COOL THE MOLDS

[75] Inventors: Jürgen Osswald; Heinz W. Patzelt; Helmut Schmidt, all of Memmingen, Fed. Rep. of Germany

[73] Assignee: Metzeler Schaum GmbH, Memmingen, Fed. Rep. of Germany

[21] Appl. No.: 945,704

[22] Filed: Sep. 25, 1978

[30] Foreign Application Priority Data

May 12, 1978 [DE] Fed. Rep. of Germany ....... 2820802

[51] Int. Cl.³ .............................................. B29D 27/04
[52] U.S. Cl. ...................................... 264/51; 264/54; 264/331; 425/547; 425/576; 425/817 R
[58] Field of Search ............... 425/4 R, 257, 259, 576, 425/547, 817 R; 264/51, 54, DIG. 83, 331

[56] References Cited

U.S. PATENT DOCUMENTS

| 495,228 | 4/1893 | Parker | 425/257 |
|---|---|---|---|
| 2,117,400 | 5/1938 | Cobb | 425/259 X |
| 2,313,476 | 3/1943 | Neff | 425/576 X |
| 2,710,425 | 6/1955 | Rhodes | 425/576 X |
| 3,015,132 | 1/1962 | Bunting | 264/51 |
| 3,069,725 | 12/1962 | Root | 264/51 |
| 3,124,627 | 3/1964 | Hood | 264/54 |
| 3,129,270 | 4/1964 | Hood | 264/54 |
| 3,173,175 | 3/1965 | Lemelson | 425/576 X |
| 3,259,175 | 7/1966 | Kraus et al. | 264/53 X |
| 3,345,687 | 10/1967 | Marx | 425/576 X |
| 3,518,725 | 7/1970 | Donofrio | 425/576 X |
| 3,671,168 | 6/1972 | Nussbaum | 264/DIG. 83 |
| 3,680,629 | 8/1972 | Gaudreau et al. | 264/51 X |
| 3,730,665 | 5/1973 | Fortin et al. | 425/259 |
| 3,733,161 | 5/1973 | Nussbaum | 264/DIG. 83 |
| 3,812,228 | 5/1974 | Skoroszewski | 264/DIG. 83 |
| 3,833,329 | 9/1974 | Ulmachneider et al. | 425/576 X |
| 3,874,830 | 4/1975 | Carter et al | 425/4 R |
| 3,957,408 | 5/1976 | Clymer et al. | 425/220 X |
| 4,075,301 | 2/1978 | Oswald | 264/299 X |

FOREIGN PATENT DOCUMENTS 1211792 3/1966 Fed. Rep. of Germany ........... 425/576

OTHER PUBLICATIONS

Bender, Rene J. "Handbook of Foamed Plastics," Libertyville, Ill., Lake Publishing Corp., ©1965, pp. 215–220.

Primary Examiner—Philip Anderson
Attorney, Agent, or Firm—Herbert L. Lerner

[57] ABSTRACT

Foam molding apparatus wherein individual molds filled with a flowable foam-material mixture are subjectible in a hardening operation to a heating and subsequent cooling interval, includes a rotatably driven table carrying a plurality of the molds for hot-foam molded articles, means for directly and individually heating and cooling the molds, a central rotating distributor head carried by the table, and individually closable connecting lines which, with the central rotating distributor head, connect the individual molds to corresponding heating, cooling and energy-medium supply sources, and method of operation thereof.

2 Claims, 4 Drawing Figures

METHOD OF MOLDING POLYURETHANE FOAMS IN STEAM HEATED MOLDS AND ADHESION STEAM CONDENSATE IS USED TO COOL THE MOLDS

The invention relates to the utilization of a foam molding apparatus, especially for polyurethane hot-foam, wherein individual molds fillable with fluid or flowable foam-material mixture are deliverable to a heating and subsequent cooling course for a hardening operation, and to a method of operating the apparatus.

In heretofore-known foam molding apparatus for producing molded foam articles such as auto seats or articles of upholstery, molds fillable with the liquid foam-material mixture are driven on a conveyor belt through a heating plant, generally in the form of a furnace subjected to hot air, in order thereby to be brought up to the required temperature. Thereafter, the molds are cooled down again in a cold air flow or current.

A disadvantage of this heretofore known process is primarily that, due to the indirect heat supply, only a very slow and individually noncontrollable heat supply is provided, which is especially disadvantageous when molds with molded articles or sections of molded articles having varying sizes and especially varying thicknesses are successively carried on the conveyor belt, because the heating course or distance must always be adjusted or accommodated to the mold requiring the longest heating time.

It is accordingly an object of the invention to provide a foam molding method of operation which permit the molds to be heated and cooled more rapidly and individually controllably and which afford optimal accommodation to the requirements of each individual mold.

With the foregoing and other objects in view, there is provided, in accordance with the invention, the utilization of a foam molding apparatus wherein individual molds fillable with a flowable foam-material are subjectible in a hardening operation to a heating and subsequent cooling material, comprising a rotatably driven table carrying a plurality of the molds for hot-foam molded articles, means for directly and individually heating and cooling the molds, a central rotating distributor head carried by the table, and individually closable connecting lines which, with the central rotating distributor head, connect the individual molds to corresponding heating, cooling and energy-medium supply sources.

In accordance with another feature of the invention, the molds are of bipartite construction and are automatically lockable, the respective molds having an upper and a lower side and a plurality of lateral surfaces carrying cooling coils disposed closely adjacent one another, the coolant coils of the respective molds being connected in parallel and having ends respectively connected to a central inlet line and a central outlet line.

In accordance with a further feature of the invention, the molds are disposed at and about the perimeter of the table, and distributor lines for mold-heating superheated steam are included, for returning condensate, for mold-cooling cooling water and for returning heated cooling water, the distributor lines being ring-shaped and extending concentrically to the perimetrically disposed molds, at least one radial connecting line respectively connecting the distributor lines to the central distributor head, and respective connecting lines extending from each of the distributor lines to the respective individual molds.

In accordance with an added feature of the invention, the last mentioned connecting lines have separately controllable shut-off valves respectively connected therein.

In accordance with an additional feature of the invention, the shut-off valves are constructed for adjusting steam pressure.

In accordance with yet another feature of the invention, there are provided means operatively connected to the distributor line for returning condensate for reintroducing the condensate as cooling water into the distributor line for mold-cooling cooling water.

In accordance with yet a further feature of the invention, there are provided means for maintaining the cooling water at a pressure within the cooling-water distributor line preventing vaporization of the cooling water when it is introduced into the respective heated mold.

In accordance with yet an added feature of the invention, the cooling-water pressure-maintenance means is constructed for maintaining a cooling-water pressure of from about 3 to about 12 ata (atmospheres absolute) and especially a pressure of from 7 to 9 ata.

In accordance with yet an additional feature of the invention, the foam molding apparatus includes a cooling-water supply and treatment installation connected to the cooling-water distributor line and comprising a cooling-water collecting vessel connected to the distributor line for returning heated cooling water, a pressure-reducing valve connected upstream of the collecting vessel in the distributor line for returning heated cooling water, a condensate collecting vessel connected to the condensate distributor line, a controlled feed line connecting the cooling-water collecting vessel and the condensate collecting vessel, a cooler, and a connecting line connecting the cooler to the cooling-water collecting vessel a valve and a pressure-increasing pump connected in the last-mentioned connecting line.

In accordance with another feature of the invention, the connecting lines respectively extending from the distributor lines for superheated steam and for mold-cooling water terminate in common in the central inlet line of the respective molds, and the connecting lines respectively extending from the distributor lines for returning condensate and for returning heated cooling water extend in common from the central outlet line of the respective molds.

In accordance with a further feature of the invention, the rotatably driven table is formed of a symmetrically constructed polygonal base frame with as many sides as can accommodate a corresponding given number of molds, the base frame having, at the underside and outer region thereof, a circular closed runway rail formed with a ring gear at the inside thereof, the base frame having, at the upper side thereof, mounting frames for accommodating and locking in the respective individual molds.

In accordance with an added feature of the invention, the runway rail is supported on wheels rotatably held in a foundation, and including a stationary drive motor for rotating a drive gear, the drive gear meshing with the ring gear.

In accordance with an additional feature of the invention, the mounting frames, respectively, have a base plate mounted so as to be vertically displaceable, an air cushion disposed beneath the base plate and being inflatable by compressed air for lifting the respective mold, after it has been filled with foam-material mixture and locked, and for pressing the mold against upper stop means of the respective mounting frames.

In accordance with the invention, there is also provided a method of operating the foam molding apparatus which comprises filling individual molds with a flowable foam material mixture and successively passing superheated steam and cooling water through one and the same cooling coils provided at the molds for successively heating and cooling the respective molds the molded article of foam material being removed before passing the cooling water through the coils.

In accordance with another mode thereof, the method comprises passing the cooling water into the cooling coils of the respective heated mold at a pressure of from substantially 3 to substantially 12 ata so as to prevent vaporization of the cooling water.

In accordance with a more specific mode of the method of the invention, the cooling water pressure in the heated molds is 7 to 9 ata.

In accordance with a concomitant mode thereof, the method comprises centrally controlling the duration of the mold heating and cooling periods.

Other features which are considered as characteristic for the invention are set forth in the appended claims.

Although the invention is illustrated and described herein as embodied in a foam molding method of operating the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
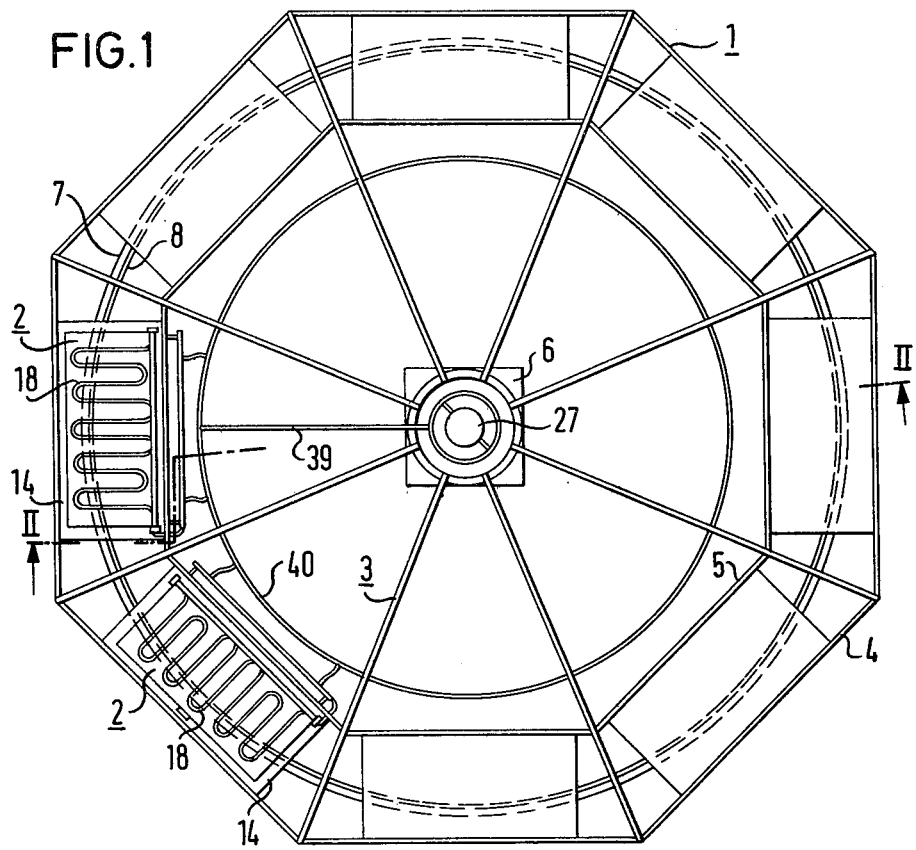
FIG. 1 is a top plan view of the foam molding apparatus according to the invention.
Figure 2:
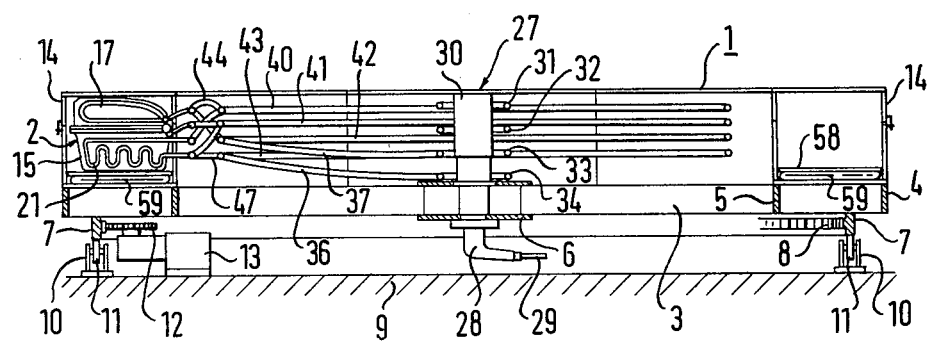
FIG. 2 is a cross-sectional view of FIG. 1 taken along the line II—II in direction of the arrows.

Referring now to the drawing and first, particularly, to FIGS. 1 and 2 thereof, there is shown a foam molding apparatus constructed in accordance with the invention which has, in the illustrated embodiment, an octagonal table 1 capable of accommodating eight molds 2 at the outer perimeter thereof. In principle, the table 1 may also be suitably constructed to accommodate any desired number of molds such as, for example, six or twelve or more molds. The table, is formed mainly of a stellar base frame 3 with respective transverse struts 4 and 5 as well as a central nodal-point plate 6. A circular closed track runway rail 7 with a ring gear 8 at the inside thereof is disposed at the underside of the base frame 3 somewhat below the molds 2. This rail 7 is mounted on several wheels 11 held by suitable supports or brackets 10 that are anchored in a foundation 9 and is driven by a drive motor 13 having a drive gear 12 meshing with the ring gear 8, so that the table 1 is rotated at a given velocity.

Mounting frames 14 for accommodating the molds 2 per se are disposed in corresponding number at the outer perimeter and at the upper side of the base frame 3. As shown especially in FIG. 4, the molds 2 per se are of bipartite construction with a lower part 15 and a cover part 17 connected through articulating joints or hinges 16 to the lower part 15 so as to be swingable relative thereto into a raised or open position.

Figure 4:
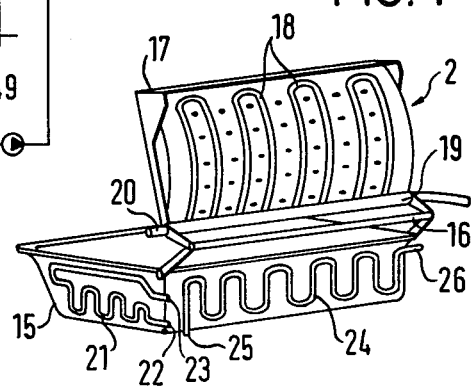
FIG. 4 is a fragmentary perspective view of FIG. 1 illustrating one of the foam molds from the rear thereof in swung-open condition and showing the cooling coils therefor.

Each of the molds 2 is provided, in accordance with the invention, with cooling coils 18, 21, 24 (FIG. 4) at the surface on all sides thereof. More specifically, as shown in FIG. 4, the cover 17, for example, has cooling coils 18 on the upper side thereof, which are connected, respectively, at one end thereof, to a central inlet line 19 and, at the other end thereof, to an outlet line 20 disposed in a covered position. On the lateral surface of the lower part 15 visible in FIG. 4, there is provided an additional cooling coil 21 with an inlet 22 and an outlet 23 thereof, and on the rear side of the lower part 15, a cooling coil 24 with an inlet 25 and an outlet 26.

The molds 2 and the cooling coils 18, 21 and 24 thereof are subjected successively to steam for heating or to cooling water for cooling. The various working media, as is apparent from FIGS. 1 and 2, are, in that regard, supplied and discharged through a central distributor head 27 disposed in the rotary axis of the table 1, the distributor head 27 being formed of a stationary lower part 28 with supply and discharge lines 29 which are not shown in detail, and an upper part 30, rotating together with the table 1, from which individual supply lines extend. Within this distributor 27, pressure and liquid-tight transition from the stationary to the rotating system occurs. According to the illustrated embodiment, the upper part 30 is surrounded by four ring lines 31, 32, 33 and 34 disposed above one another, which are connected through radial connecting lines 36 to 39, respectively, to respective distributor lines 40 to 43 which are disposed above one another radially within the molds 2. Connecting lines 44 to 47, respectively, extend from these distributor lines 40 to 43 to corresponding inlet and outlets of the cooling coils 18, 21 and 24 at the molds 2.

Figure 3:
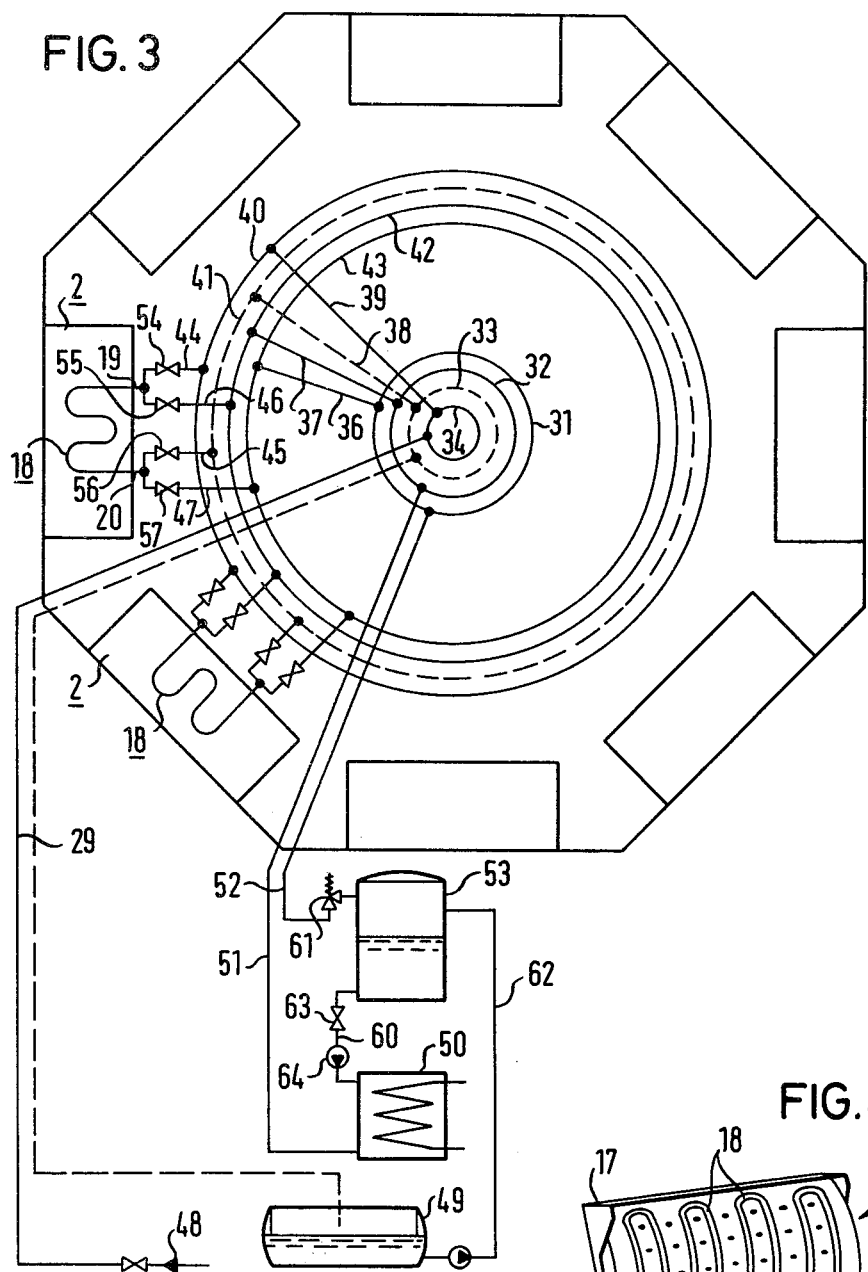
FIG. 3 is a diagrammatic plan view of the foam molding apparatus with a basic schematic diagram of the feed and discharge lines connected thereto for heating and cooling media with respective external supply devices.

In FIG. 3 the circuit or circulatory loop of the various heating and cooling media are illustrated. Superheated steam flows, for example, from a steam source 48, which is not shown in detail, through the stationary line 29 and the central distributor head 27 into the ring line 34 surrounding the latter and from there through the radial connecting line 39 into the distributor line 40 from where the steam is conducted through respective connecting lines 44 of the individual molds 2 to the inlet line 19 of the cooling coil 18. The steam condensate flows back out of the cooling coil 18 and through the outlet line 20, the connecting line 45, the distributor line 41, the radial connecting line 38 and the ring line 33 into a condensate collecting vessel 49, from which, through a non-illustrated boiler, it is again introduced into the circuit as steam 48.

For the subsequent cooling operation, the cooling water flows out of a cooler 50 through a connecting line 51 and the distributor head 27 into the ring line 32, from the latter through the radial connecting line 37 into the distributor line 42 and therefrom through the connecting line 46 to the same inlet line 19 of the cooling coil 18, so that the mold 2 is thereby cooled to the required extent. The heated cooling water leaves the cooling coil 18 through the outlet line 20, the connecting line 47, the distributor line 43 and the radial connecting line 36, and flows through the ring line 31 and a backflow or return line 52 into a cooling-water collecting vessel 53 from where, through a connecting ling 60, it is cooled down in the cooler 50 and, thereafter, resupplied anew to the circuit.

As is, furthermore, apparent from FIG. 3, each of the connecting lines 44 to 47 has its own shut-off valve 54 to 57. These valves 54 to 57 are subject to time-dependent control, which can also be dependent upon the rotation and setting of the table 1.

The operation of the foregoing foam molding apparatus according to the invention, is as follows:

After filling the molding 2 with foam material mixture somewhat in the position shown in FIG. 3 and, after closing the cover 17 of the respective mold 2, the valves 54 and 56 are opened when the table 1 has reached the next position or setting thereof, so that steam can flow in and the mold can be heated to the desired temperature. After reaching and maintaining the required temperature, somewhat after one-half a rotation of the respective mold 2, the valves 54 and 56 are again closed, the cover 17 of the mold 2 opened, the molded article removed and the valves 55 and 57 opened so that cooling water of suitable temperature can flow through the cooling coils 18, 21, 24, and the mold 2 can be cooled down again to the desired starting temperatures.

In this regard, it is essential that, not only superheated steam is supplied under elevated pressure for attaining the prescribed temperature, but also that the cooling water is supplied at elevated pressure in order to avoid vaporization upon entry thereof into the hot mold 2 and consequent destruction thereof. The cooling-water pressure is, advantageously, between about 3 to 12 atmospheres absolute (ata) and can be especially between 7 and 9 ata.

Furthermore, in order to avoid corrosion formation in the cooling coils 18, 21, 24 of the molds 2, it is advantageous, in accordance with the invention, to use the condensate of the steam as the cooling water. To this end, the cooling-water collecting vessel 53 has a controlled inlet or feed line 62 from the condensate collecting vessel 49, through which the respective condensate can be fed into the cooling-water collecting vessel 53.

Since the cooling water flows back from the foam molding equipment through the return line 52 at elevated pressure, a pressure-reducing valve 61 is provided in front or upstream of the condensate collecting vessel 53. A valve 63 and a pressure-increasing pump 64 are additionally connected into the connecting line 60 between the condensate collecting vessel 53 and the cooler 50 in order to restore the cooling water to the required pressure for vapor-free or non-volatile cooling of the molds 2.

The valves 54 to 57 are adjustable individually i.e. separately for each mold 2, in accordance with the respective requirements of heating and cooling with regard to pressure, temperature and duration for the respective molded article. An optimal temperature course or trend is produced which results, altogether, in a considerable reduction in the time necessary for hardening the molded article and an improvement in the quality thereof.

In order to ensure reliable closing of the mold 2 during the entire working process, as shown in FIG. 2, a base plate 58 mounted so as to be vertically displaceable is disposed in the support frame 14, an air cushion 59 inflatable with compressed air being located beneath the base plate 58. After closing the mold 2, the base plate 59 and the mold 2 therewith are lifted upwardly by blowing up the cushion 59 and are pressed firmly against a stop, which is not specifically shown in the drawing, so that an additional stable closing force thus acts upon the mold 2.

There are claimed:

1. Method of heating and cooling molds of a foam molding apparatus for forming articles of polyurethane hot-foam wherein molds having a plurality of tubular coils disposed at the surfaces thereof are initially filled with a flowable polyurethane foam material mixture, which comprises passing superheated steam through the tubular coils for heating the molds from a starting temperature to a temperature exceeding the temperature of water vaporization, condensing the steam and, after removing the formed article, passing the condensate of the steam as cooling water through the very same tubular coils at elevated pressure to avoid vaporization of the cooling water due to the heated temperature of the molds which exceeds water vaporization temperature, so as to recool the molds to the starting temperature thereof.

2. Method according to claim 1 wherein the cooling water is passed through the tubular coils at a pressure of from 3 to 12 atmospheres absolute.

* * * * *